United States Patent [19]
Costa, Sr.

[11] Patent Number: 5,615,524
[45] Date of Patent: Apr. 1, 1997

[54] MASTHEAD AND SPREADER BIRD ROOSTING GUARD

[76] Inventor: Edward A. Costa, Sr., 58 Columbia Ave., Marstons Mills, Mass. 02648

[21] Appl. No.: 540,319

[22] Filed: Oct. 6, 1995

Related U.S. Application Data

[63] Continuation-in-part of Ser. No. 10,499, Jul. 12, 1993, abandoned.

[51] Int. Cl.⁶ ...................................................... E04B 1/72
[52] U.S. Cl. ........................................................... 52/101
[58] Field of Search ............................ 52/101, 147; 43/1, 43/58; 114/343, 221 R; 441/1; 411/82, 258, 457, 473

[56] References Cited

U.S. PATENT DOCUMENTS

| | | | |
|---|---|---|---|
| 2,306,080 | 12/1942 | Peles | 52/101 |
| 2,887,730 | 5/1959 | Bittner | 52/101 |
| 3,282,000 | 11/1966 | Shaw et al. | 52/101 |
| 3,407,550 | 10/1968 | Shaw | 52/101 |
| 4,404,778 | 9/1983 | Ushimaru | 52/101 |
| 4,994,073 | 2/1991 | Green | 411/457 X |
| 5,058,335 | 10/1991 | Richter | 52/101 |
| 5,314,427 | 5/1994 | Goble et al. | 411/457 X |
| 5,400,552 | 3/1995 | Negre | 52/101 |

FOREIGN PATENT DOCUMENTS

| | | | |
|---|---|---|---|
| 289038 | 11/1988 | European Pat. Off. | 411/457 |
| 300936 | 1/1989 | European Pat. Off. | 43/1 |
| 1243366 | 6/1967 | Germany | 411/457 |
| 190732 | 7/1992 | Japan | 43/1 |

Primary Examiner—Carl D. Friedman
Assistant Examiner—Aimee E. McTigue
Attorney, Agent, or Firm—Thomas A. Kahrl, Esq.

[57] ABSTRACT

A masthead and spreader bird roosting guard having unique prongs consisting of copper tacks having elongated cut sharp points combined with a self adhesive strip on a metal strip for providing a continuous guard device directed to maritime use on a masthead members including mastheads and spreaders.

7 Claims, 4 Drawing Sheets

MASTHEAD AND SPREADER BIRD ROOSTING GUARD

CROSS REFERENCE TO RELATED APPLICATIONS

This application is a continuation-in-part of U.S. patent application Ser. No. 29/010,499 filed Jul. 12, 1993, abandoned, entitled MASTHEAD AND SPREADER GUARD of Edward Costa, Sr., which is incorporated herein by reference.

BACKGROUND OF THE INVENTION

1. Field of the Invention (Technical Field).

The present invention relates to devices for preventing roosting of sea birds on masts of vessels, particularly to a guard for use on mastheads and spreaders and to associated navigational aids.

2. Background Art

Birds are attracted to spreaders and mastheads as they provide excellent roosts in harbors which otherwise lack perches of commensurate height adjacent the water. Roosting birds are a nuisance as they leave droppings which are a health hazard as well as cause damage to deck surfaces affected.

The use of spikes mounted on perches and ledges of structures such as buildings are generally known. However typical bird proofing devices have been fastened to the surfaces to be protected with threaded fasteners and mounting brackets and accordingly are difficult and hazardous to install. Applicant is aware of prior art devices which employ a plurality of pointed objects including British (patent 622, 372) having a row of spikes mounted on a bracket to be attached to a building by nails or threaded fasteners which would otherwise render the device inoperative for marine use. The present invention design incorporates unique prongs consisting of copper tacks having elongated cut sharp points combined with a self adhesive strip on a metal strip for providing a continuous guard device. thereof.

The present invention overcomes the limitations expressed above of the prior technology. The prior art does not present such an efficient and effective apparatus of preventing roosting of sea birds on a vessel. Despite the teachings of the prior art, there has not been a device which employs the advantageous characteristics of easy installation for marine application on mastheads and spreaders of masts of vessels and to associated navigational aids of sharp elongated prongs utilizing self adhesive strips. Accordingly, it is desirable to provide for a new and improved device for preventing roosting of sea birds on masts of vessels, particularly, to a guard for use on mastheads and spreaders of masts of vessels and to associated navigational aids which is easy to install, is very effective and is lightweight and economical.

SUMMARY OF THE INVENTION

The present invention is directed to a masthead and spreader bird roosting guard having a planar base for attachment to lateral surfaces of marine vessel mast members. In particular the invention features a self adhesive means for ease of attaching to said lateral surfaces of said mast members without threaded attachment devices adapted to form extendable rows of tacks for preventing the deposit of bird droppings on said vessels topside surfaces.

Application of the present invention may be made to lateral members of mast or the top surfaces of navigational aids. Referring to FIG. 7 application to mastheads and spreaders to provide protection against the deposit of droppings by sea and other birds consists of numerous prongs consisting of copper tacks having very sharp points at one end and heads at the opposite end. These prongs are located on those lateral surfaces of the mast members and navigational aids thereby preventing a bird from alighting and perching thereon. The prongs which are arranged to project therefrom such that when a bird does alight and perch thereon, said tacks render the perching to be so uncomfortable as to a) incur prompt departure and b) render subsequent return attempt most unlikely.

Attaching a guard to the masthead or spreader guard is normally very difficult due to the height and lack of climbing means such as a ladder above the deck of the vessel. The present invention provides a unique convenient means of attaching the very sharp tacks arranged in a continuous row continuous with the spreader guard top surface, configured to extend throughout the entire lateral exposed roosting area. The first step is to arrange the tacks single file in a row extending through a sheet of metal such that the heads are supported against the sheet to arrange the spikes in orthogonal relationship thereto, the next step is to fasten a double faced adhesive trip over the heads, arranged to engage the lateral surface. The strip can be sized to fit the available roosting space. The tacks are formed which have elongated thin points which retain their effectiveness over long periods of time to prevent roosting which is advantageous due to the inaccessibility of the tops of the mast members such as a masthead or spreader guard.

Accordingly, the object and purpose of the present invention is to provide for an ease of installation on masthead members of a waterborne vessel of a bird guard.

Another object of the present invention is to provide an improved masthead and spreader bird roosting guard having an extendable row of sharp thin tacks for preventing roosting of birds.

Yet a further object of the present invention is to provide a self adhesive mounting means adapted for installation by means of a bosoms chair.

Another object of the present invention is to provide a bird guard having an extendable row of sharp thin tacks for preventing roosting of birds on navigational aids on vessels.

The invention will be described for the purposes of illustration only in connection with certain embodiments. However, it is recognized that those persons skilled in the art may make various changes, modifications, improvements and additions on the illustrated embodiments all without departing from the spirit and scope of the invention.

BRIEF DESCRIPTION OF THE DRAWINGS

The accompanying drawings, which are incorporated into and form a part of the specification, illustrate several embodiments of the present invention and together with the description serve to explain the principals of the invention. The drawings are only for the purpose of illustrating a preferred embodiment of the invention and are not construed as limiting the invention.

DETAILED DESCRIPTION OF THE PREFERRED EMBODIMENT

Figure 1:
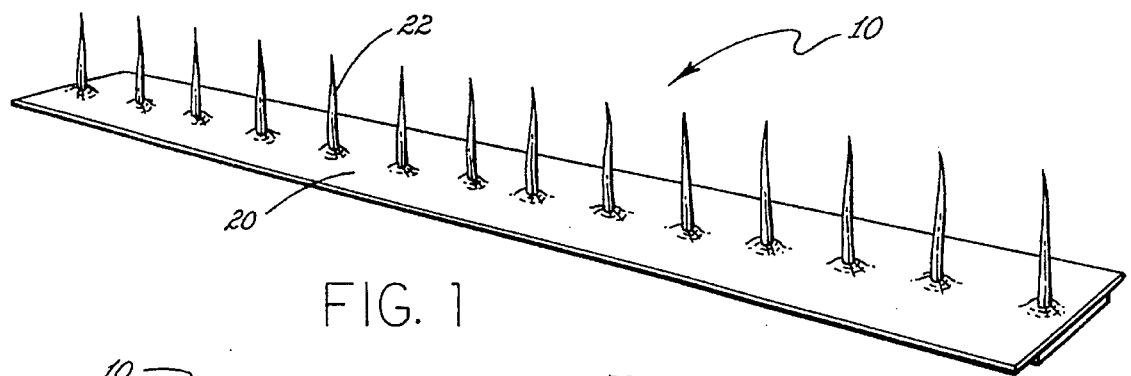
FIG. 1 is a perspective view of the Masthead and Spreader Bird Roosting Guard of the present invention.
Figure 2:
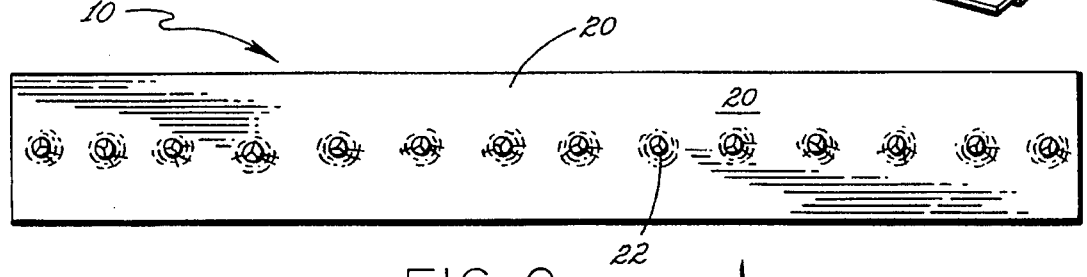
FIG. 2 is a top plan view of the invention of FIG. 1.

Referring to the drawings, there is in FIGS. 1–7 there is shown a masthead and spreader bird roosting guard 10 for deterring roosting of sea birds on mastheads 12 and spreaders 14 of a mast 16 of a vessel 18. As is shown in FIGS. 1–6 masthead and spreader bird roosting guard 10 includes a base 20 for supporting prongs 22 said base comprising a flat longitudinal sheet 24 consisting a thin sheet of metal adapted to be cut to size on location to be sized to match a perch area 26 such as a spreader 14. A self adhesive strip 28 is attached to said base for mounting the masthead and spreader bird roosting guard 10 on mast 16 having a strip of double faced adhesive having adhesive on the top 30 for attaching to said base member arranged to cover heads 32 of prongs 22 and on the bottom 31 to attach to said perch area having an area less than said base and arranged to be coplanar therewith, said bottom side having a peelable cover strip 33.

Figure 3A:
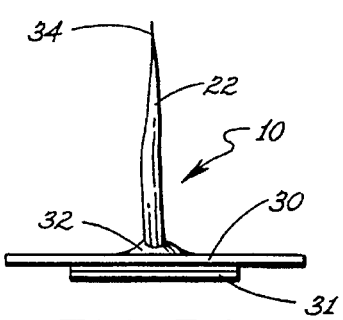
FIG. 3A is a end elevational view of the invention of FIG. 1.
Figure 3B:
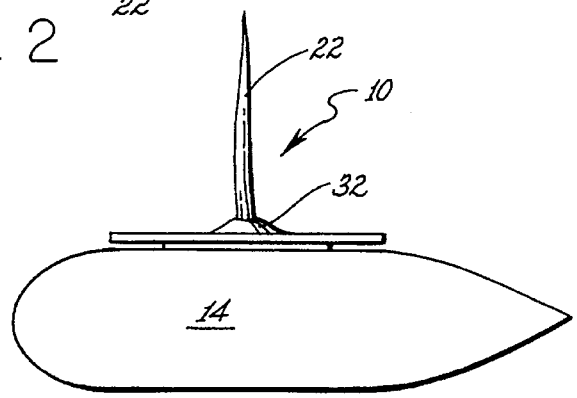
FIG. 3B is a end elevational view of the invention of FIG. 1 shown mounted on the spreader shown in FIG. 7.
Figure 4:
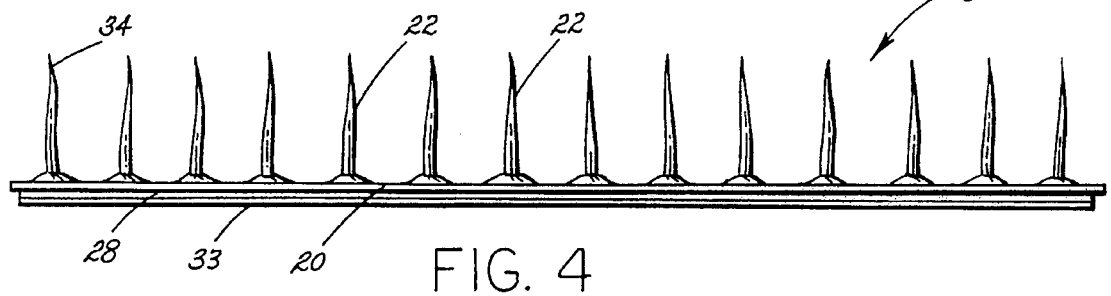
FIG. 4 is a left side elevational view of the invention of FIG. 1.
Figure 5:
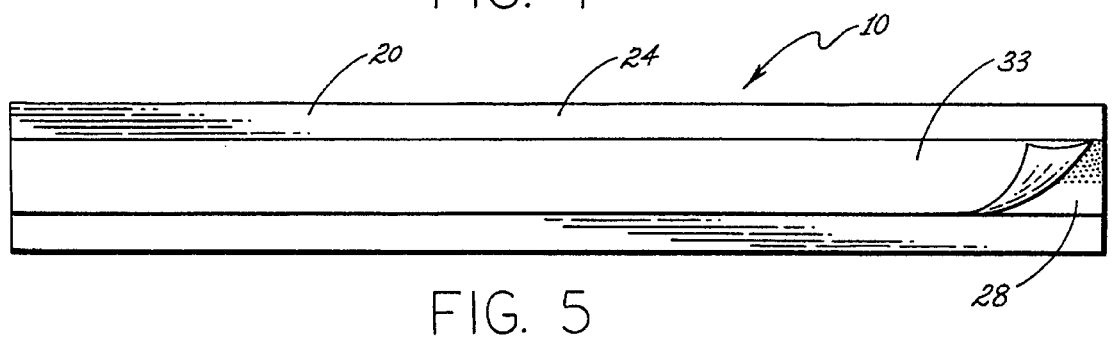
FIG. 5 is a bottom plan view shown with the corner of a protective strip peeled back of the invention of FIG. 1.
Figure 6:
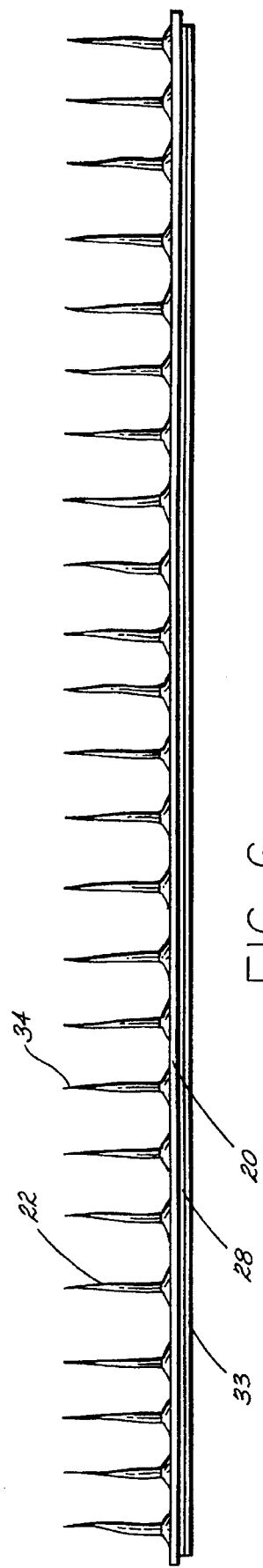
FIG. 6 is a side elevation of an extended embodiment of the invention of FIG. 1.
Figure 7:
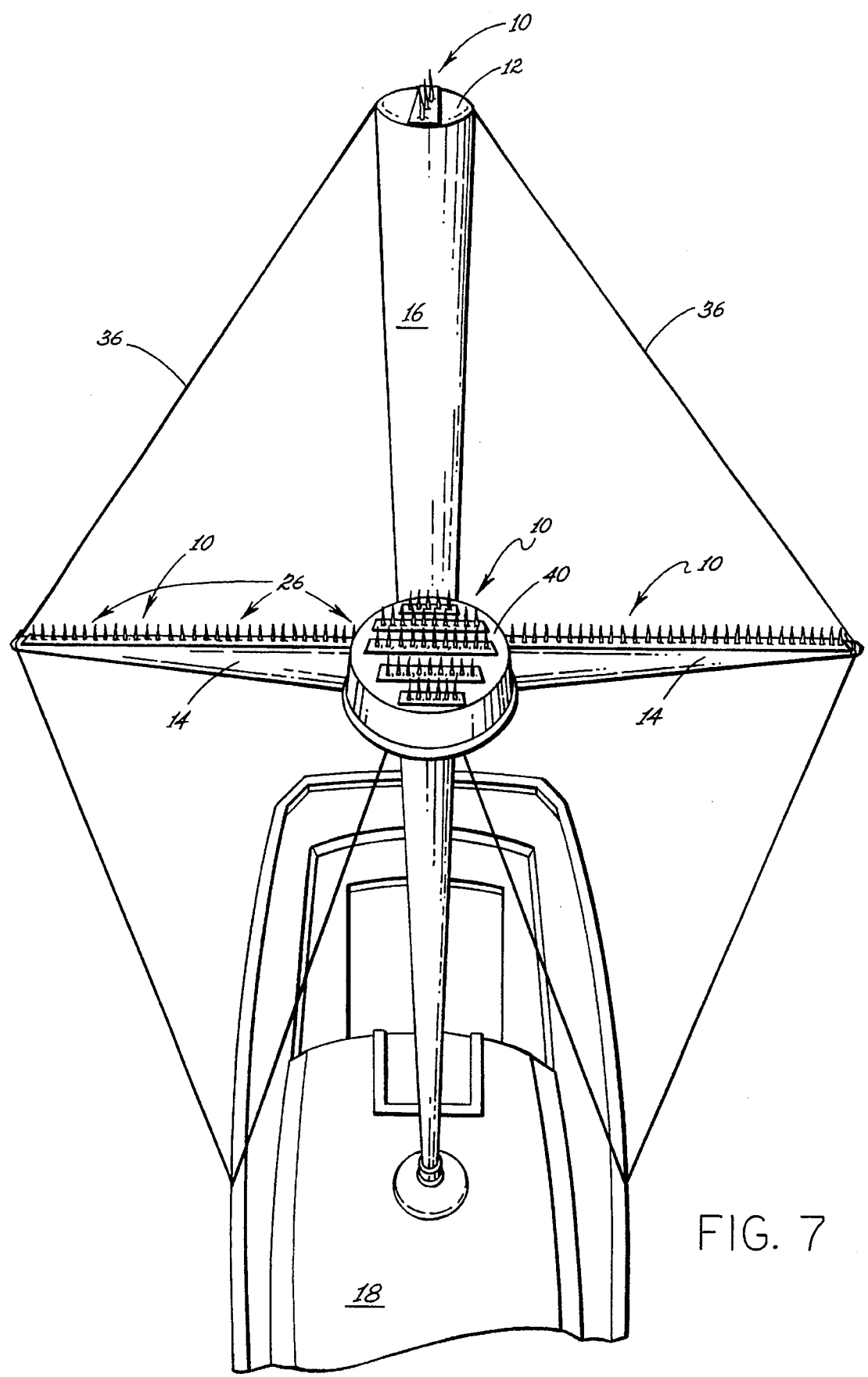
FIG. 7 is a perspective view of the a masthead and spreader bird roosting guard of the invention of FIG. 1 shown arranged on a mastheads and on spreaders of a mast of a vessel

The prongs 22 comprise elongated tacks having cut sharp points 34 spaced apart in an extendable row projecting through said base having heads 32 anchored between base 20 and said adhesive strip extending over the entirely of perch area 26 for deterring birds from roosting thereon. As is shown in FIG. 3B and 7 the spreader means for keeping stays 36 apart mounted on a mast member defining a perch area:

In the preferred embodiment prongs 22 consisting of copper tacks having elongated cut sharp points 34 spaced apart in a row combined with a self adhesive strip 24 on a metal strip for providing a continuous guard shown in FIG. 7 in an extendable row projecting through said base having heads 32 anchored between base 20 and adhesive strip 28 the masthead and spreader bird roosting guard 10 extending over the entirely of perch area 26 afforded by spreader 14 and by a navigational aid 40.

Figure 8:
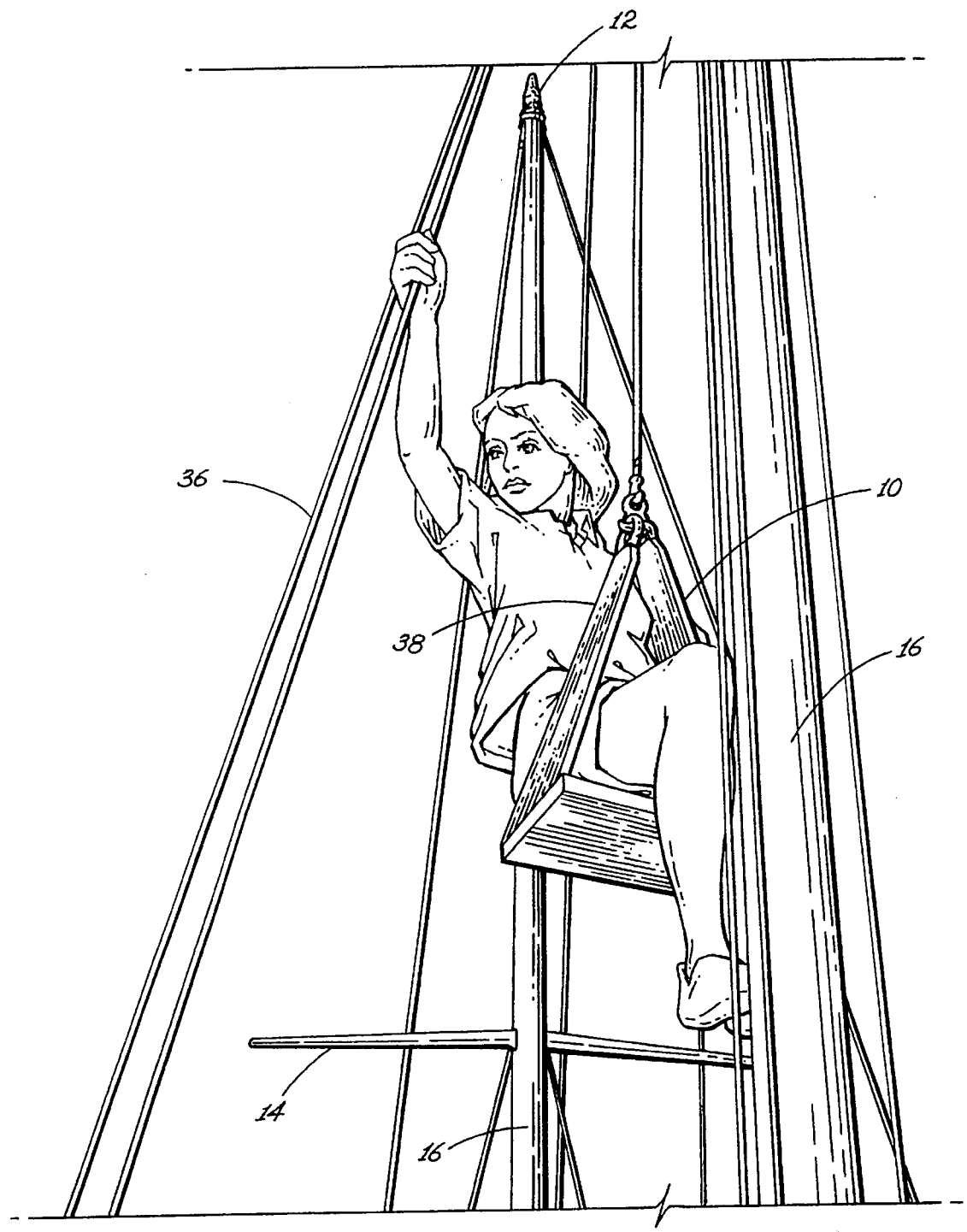
FIG. 8 is a perspective view of a person in a bosun's chair suspended from a mast of a vessel installing the masthead and spreader bird roosting guard of the invention of FIG. 1.

As is shown in FIG. 8 there shown a perspective view of a person in a bosun's chair 38 suspended from mast 16 of the vessel 18 installing a masthead and spreader bird roosting guard 10.

The invention also includes a method of preventing the roosting of sea birds on maritime vessel masts comprising the steps of providing spreader means for keeping stays apart mounted on a mast member defining a perch area; providing base means for supporting the deterrent means comprising a flat longitudinal extendable to match the spreader; attaching self adhesive means for mounting the guard means on a mast member to said perch area; arranging tacks single file such that the heads are supported against the sheet to arrange the spikes in orthogonal relationship thereto, having cut sharp points spaced apart in an extendable row wherein said tacks projecting through said base having heads anchored between the base and the adhesive means extending over the entirely of the perch area, sizing to fit the available roosting space, and fastening a double faced adhesive trip over the heads, arranged to engage the lateral surface of the spreader.

What is claimed is:

1. A bird roosting guard adapted for deterring roosting of sea birds on perch areas of sea vessels comprising:

a mast member having a masthead defining a first lateral perch area and including a laterally extending spreader means for separating stays defining a second lateral perch area;

b. guard means in combination with said first and second perch areas comprising;

i. an adjustable base member comprising a flat longitudinal strip of metallic material configured to be mounted on said first and second perch areas;

ii. self adhesive means for mounting said guard means on said first and second perch areas consisting essentially of a strip of double-faced adhesive attached to said base member arranged in coplanar relationship therewith;

iii. a plurality of elongated tack members attached to said base arranged in spaced-apart orthogonal relationship therewith, each tack member having a head at one end and a sharp point at an other end, wherein said tack members are arranged in spaced apart relationship in at least two rows extending the entire length of the base member arranged to project through said base such that each head is securely anchored between the base and said self adhesive means and wherein said guard means is attached to said perch areas and extends over the entirety of each perch area for deterring birds from roosting thereon.

2. The bird roosting guard of claim 1 wherein the base consists of a thin sheet of metal is configured to match the perch area and is adapted to be cut to size during installation on location.

3. The bird roosting guard of claim 1 wherein installation is enabled by employment of a bosuns chair apparatus connected adjacent each perch area.

4. The bird roosting guard of claim 1 wherein said adhesive means comprises a top side attached to the base and a bottom including a peelable cover strip for ease of use in handling including during installation.

5. The bird roosting guard of claim 1 wherein the tack members consist of copper tacks having elongated cut sharp points arranged in an array extending over the entirety of a perch area afforded by masthead.

6. A bird roosting guard adapted for deterring roosting of sea birds on perch areas including navigational aids of vessels comprising:

a. a navigational aid having a stop surface defining a perch area;

b. guard means in combination with said perch area comprising;

i. an adjustable base member comprising a flat longitudinal strip of metallic material configured to be mounted on said perch area;

ii. self adhesive means for mounting said guard means on said perch area consisting essentially of a strip of double-faced adhesive attached to said base member arranged in coplanar relationship therewith;

iii. a plurality of elongated tack members attached to said base arranged in spaced-apart orthogonal relationship therewith, each tack member having a head at one end and a sharp point at an other end, wherein said tack members are arranged in spaced apart relationship in at least two rows extending the entire length of the base member arranged to project through said base such that each head is securely anchored between the base and said self adhesive means and wherein said guard means extends over the entirety of said perch area for deterring birds from roosting thereon.

7. A method of installing guards for preventing the roosting of sea birds on defined perch areas on maritime vessels comprising the steps of;

a. providing a bird roosting guard in combination with defined perch areas comprising;
   i. an adjustable base member;
   ii. self adhesive means for mounting said guard on said perch areas;
   iii. a plurality of elongated tack members attached to said base arranged in spaced-apart orthogonal relationship therewith;

b. employing the self adhesive means to attach to said perch areas;

c. attaching a bosuns chair adjacent the perch area and employing the bosuns chair to gain access to each of said perch areas;

d. cutting the guard means to match the perch area; and e. attaching the guard to said perch area, wherein the nuisance caused by roosting of birds is prevented.

* * * * *